US007164841B2

(12) United States Patent
Lefebvre

(10) Patent No.: US 7,164,841 B2
(45) Date of Patent: Jan. 16, 2007

(54) REEL TO REEL MANUFACTURING LINE

(75) Inventor: Paul Lefebvre, Laval (CA)

(73) Assignee: Lxsix Photonics Inc., Quebec (CA)

( * ) Notice: Subject to any disclaimer, the term of this patent is extended or adjusted under 35 U.S.C. 154(b) by 0 days.

(21) Appl. No.: 11/106,168

(22) Filed: Apr. 13, 2005

(65) Prior Publication Data
US 2005/0185911 A1 Aug. 25, 2005

Related U.S. Application Data

(62) Division of application No. 10/276,901, filed as application No. PCT/CA02/01183 on Jul. 26, 2002, now Pat. No. 6,934,459.

(30) Foreign Application Priority Data

Jul. 26, 2001 (CA) .................................. 2354211

(51) Int. Cl.
G02B 6/00 (2006.01)
(52) U.S. Cl. ...................... 385/134; 385/136
(58) Field of Classification Search ................. 385/134
See application file for complete search history.

(56) References Cited

U.S. PATENT DOCUMENTS

| 4,920,738 | A | * | 5/1990 | White et al. ................... 57/62 |
| 5,019,780 | A | | 5/1991 | Bailey |
| 5,066,133 | A | | 11/1991 | Brienza |
| 5,137,351 | A | * | 8/1992 | So ........................... 356/73.1 |
| 5,156,355 | A | | 10/1992 | Wadle |
| 5,194,847 | A | * | 3/1993 | Taylor et al. ............... 340/557 |
| 5,377,288 | A | | 12/1994 | Kashyap et al. |
| 5,572,609 | A | | 11/1996 | Li et al. |
| 5,589,933 | A | * | 12/1996 | Osgood et al. ............ 356/73.1 |
| 5,604,829 | A | | 2/1997 | Bruesselbach |
| 5,649,035 | A | * | 7/1997 | Zimmerman et al. ......... 385/13 |
| 5,745,615 | A | | 4/1998 | Atkins et al. |
| 5,912,999 | A | | 6/1999 | Brennan, III et al. |
| 5,956,442 | A | | 9/1999 | Byron |
| 6,004,703 | A | | 12/1999 | Jang et al. |
| 6,035,083 | A | | 3/2000 | Brennan, III et al. |
| 6,050,109 | A | | 4/2000 | Kosinski et al. |

(Continued)

FOREIGN PATENT DOCUMENTS

GB 2 084 618 4/1982

(Continued)

Primary Examiner—Michelle Connelly-Cushwa
(74) Attorney, Agent, or Firm—Merchant & Gould P.C.

(57) ABSTRACT

The invention relates to a line for processing an optical fiber having first and second ends, the line comprising a support for receiving a reel with the fiber wounded thereon; a de-winder for unwinding the fiber without substantial rotation of the reel; and a processing station for receiving the optical fiber from said de-winder to perform a processing on a portion of the optical fiber. The invention also relates to a method for writing a grating on a fiber having first and second ends, the fiber being wounded on a first reel and being capable of being wounded on a second reel, the method comprising connecting the first end of the fiber to a circulator; connecting said circulator to a source of light and to a first measurement means; de-winding the fiber from the first reel without rotation of the reel; writing a grating on the fiber with a source of radiation; and measuring reflection spectra of the grating with said first measurement means. The method also comprises winding the fiber on the second reel without rotation of the reel.

61 Claims, 13 Drawing Sheets

U.S. PATENT DOCUMENTS

| | | |
|---|---|---|
| 6,084,998 A | 7/2000 | Straayer |
| 6,093,927 A | 7/2000 | Wickham |
| 6,160,944 A | 12/2000 | Payne et al. |
| 6,195,484 B1 | 2/2001 | Brennan, III et al. |
| 6,201,911 B1 | 3/2001 | Jang |
| 6,204,969 B1 | 3/2001 | Jang |
| 6,272,886 B1 | 8/2001 | Novack et al. |
| 6,296,201 B1 | 10/2001 | Jackson et al. |
| 6,519,026 B1 * | 2/2003 | Holland ............... 356/73.1 |
| 6,739,154 B1 * | 5/2004 | Davis ..................... 65/378 |
| 2001/0020375 A1 * | 9/2001 | Novack et al. ............ 65/485 |

FOREIGN PATENT DOCUMENTS

| | | |
|---|---|---|
| WO | WO 98/18031 | 4/1998 |

* cited by examiner

REEL TO REEL MANUFACTURING LINE

This application is a Divisional application Ser. No. 10/276,901, filed Jan. 16, 2003 now U.S. Pat. No. 6,934,459, which is the National Stage of Application PCT/CA02/01183, filed Jul. 26, 2002 and which application(s) are incorporated herein by reference.

FIELD OF THE INVENTION

The present invention relates to a reel to reel manufacturing line for processing an optical fiber.

SUMMARY OF THE INVENTION

The invention seeks to provide an automated manufacturing line to write successive optical devices, such as Bragg gratings, on an optical fiber. The line includes all the required functions to provide complete final products fully characterized, including quality control, requiring only to be cut in desired length segments and to be packaged. Alternatively, any optical waveguide which could be wound on a reel could-be processed by the manufacturing line.

The manufacturing line comprises an apparatus for unwinding (de-winder) the optical fiber from a first reel without rotating the reel, the apparatus being located at one end of the manufacturing line. The de-winder can be placed in a cooled enclosure if the first reel has a hydrogen-loaded fiber wound thereon. At the other end of the line, the line comprises an apparatus for winding the fiber on a second reel also without rotating the reel. This enables the connection of both ends of the fiber, which can be a few kilometers long, to optical measurement instruments. Indeed, instead of using a rotating coupler, standard couplers and connectors are used.

A fabrication apparatus (source of optical radiation) is placed between the first and second reels, and data acquisition and process control are possible since the fiber is connected at both ends. The fabrication apparatus can be a fiber grating-manufacturing device (laser), a fiber grating measurement device, a fiber sectional measurement device or a fiber coating modification device.

For a reel to reel manufacturing line for writing Bragg gratings, the line comprises a source of optical radiation (laser) delivering the high energy (beam) to write the Bragg gratings and an apparatus for aligning the fiber with the source of optical radiation (laser). The apparatus for aligning the fiber with the laser comprises a support for holding the fiber, wherein in use the support is oriented such that the beam emitted by the laser illuminates a first portion of the fiber thereby causing the fiber to emit photoluminescence and a sensor located in proximity to the fiber for detecting photoluminescence emitted radially by the fiber and generating an intensity signal indicative of a measure of the photoluminescence detected. The apparatus also comprises a controller module responsive to the intensity signal for causing the beam emitted by the laser to illuminate a second portion of the fiber.

The line may also be use to write arrays of different gratings, at the same wavelengths or not, and by using a synchronized encoder, evenly spacing them or not along the fiber.

The use of the connected reel to reel line increases throughput and measurement accuracy. By adding proper inspection stations, all of the quality control can be made in line. No other measurement is therefore required and the fiber only needs to unwound from the second reel, cut at desired locations and packed and identified for shipping purposes.

Guiding devices are used to restrict the fiber path. Furthermore, the line comprises functional units, such as cleaning units, a stripping unit, an annealing unit, inspection units or a recoating unit, each unit may comprise clamping devices to position and tensioned the fiber.

Preferably, the section of the fiber to be treated is grabbed on each side by a clamping device as this section of the fiber leaves the first reel. The clamping device is mounted on a cart that is movable from one functional unit to the next one. The clamping device comprises a mechanism to adjust and monitor the tension in the grabbed section of the fiber that is used to optimize tension for each functional unit. In both cases, the different functional operations can be made one after the other or simultaneously. At each functional unit, either the fiber can be moved in place and/or the specific apparatus can be brought to the fiber by pneumatic piston and/or standard optical stage for example.

As embodied and broadly described herein, the invention seeks to provide a line for processing an optical fiber having first and second ends, the line comprising a support for receiving a reel with the fiber wounded thereon; a de-winder for unwinding the fiber without substantial rotation of the reel; and a processing station for receiving the optical fiber from said de-winder to perform a processing on a portion of the optical fiber. Preferably, the line also comprises a second support for receiving a second reel and a winder for winding the fiber on the second reel without rotation of the second reel. The line also comprises a source of optical radiation (e.g. a laser) for writing a grating on the fiber.

As embodied and broadly described herein, the invention also seeks to provide a method for processing an optical fiber having first and second ends, the fiber being wounded on a first reel and being capable of being wounded on a second reel, the method comprising: connecting the first end of the fiber to a source of light and a measurement means; de-winding the fiber from the first reel without substantially turning of the reel; processing a portion of the fiber with a source of optical radiation; and during the process, measuring reflection spectra of the portion of the fiber with said measurement means. Preferably, the method further comprising connecting the second end of the fiber to a second measurement means and measuring transmission spectra of the portion with said second measurement means. The method also comprises winding the fiber on the second reel without substantial rotation of the reel.

As embodied and broadly described herein, the invention also seeks to provide a method for performing a predetermined process on an optical fiber, comprising: providing a reel having a continuous optical fiber wounded thereon, the optical fiber having a first end and a second end; unwinding the optical fiber from the reel without substantially turning the reel; introducing light via one of the first and second ends of the optical fiber such that the light propagates in the optical fiber; performing a predetermined process on a portion of the optical fiber unwinded from the reel.

As embodied and broadly described herein, the invention also seeks to provide a method for performing a predetermined process on an optical fiber winded on a first reel, the optical fiber having first and second ends, the method comprising: unwinding the optical fiber from the first reel substantially without rotation of the first reel to create an unwinded portion; performing a predetermined process on the unwinded portion; winding the unwinded portion after the predetermined process has been performed on a second reel substantially without rotation of the second reel; during the predetermined process introducing light via one of the first and second ends of the optical fiber such that the light propagates to the unwinded portion through a portion of the optical fiber winded on either one of the first and second reels.

As embodied and broadly described herein, the invention also seeks to provide a line for measuring optical properties of gratings written on a fiber having first and second ends, the line comprising: first and second supports for receiving first and second reels, the first reel having the fiber wounded thereon; a de-winder for unwinding the fiber without rotation of the reel; a winder for winding the fiber on the second reel without rotation of the second reel; a source of light connected at one of the first and second ends of the fiber; and a measurement means connected at one of the first and second ends of the fiber for measuring optical properties of the gratings.

Other objects and features of the invention will become apparent by reference to the following description and the drawings.

BRIEF DESCRIPTION OF THE DRAWINGS

A detailed description of the preferred embodiments of the present invention is provided herein below, by way of example only, with reference to the accompanying drawings, in which.

Figure 1:
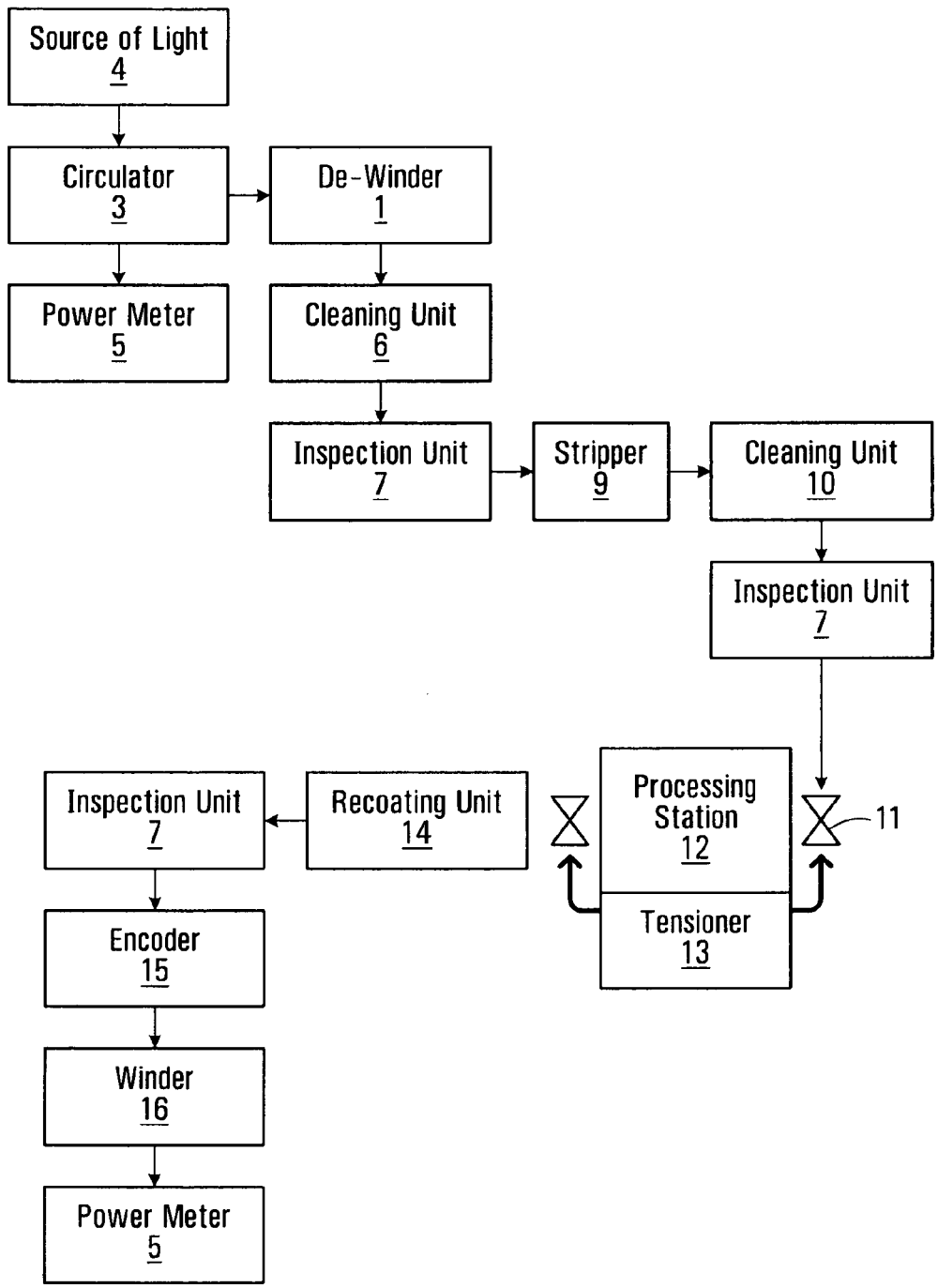
FIG. 1 shows a process flow for a reel to reel manufacturing line for writing gratings on a fiber, the line being constructed in accordance with an embodiment of the invention.
Figure 2:
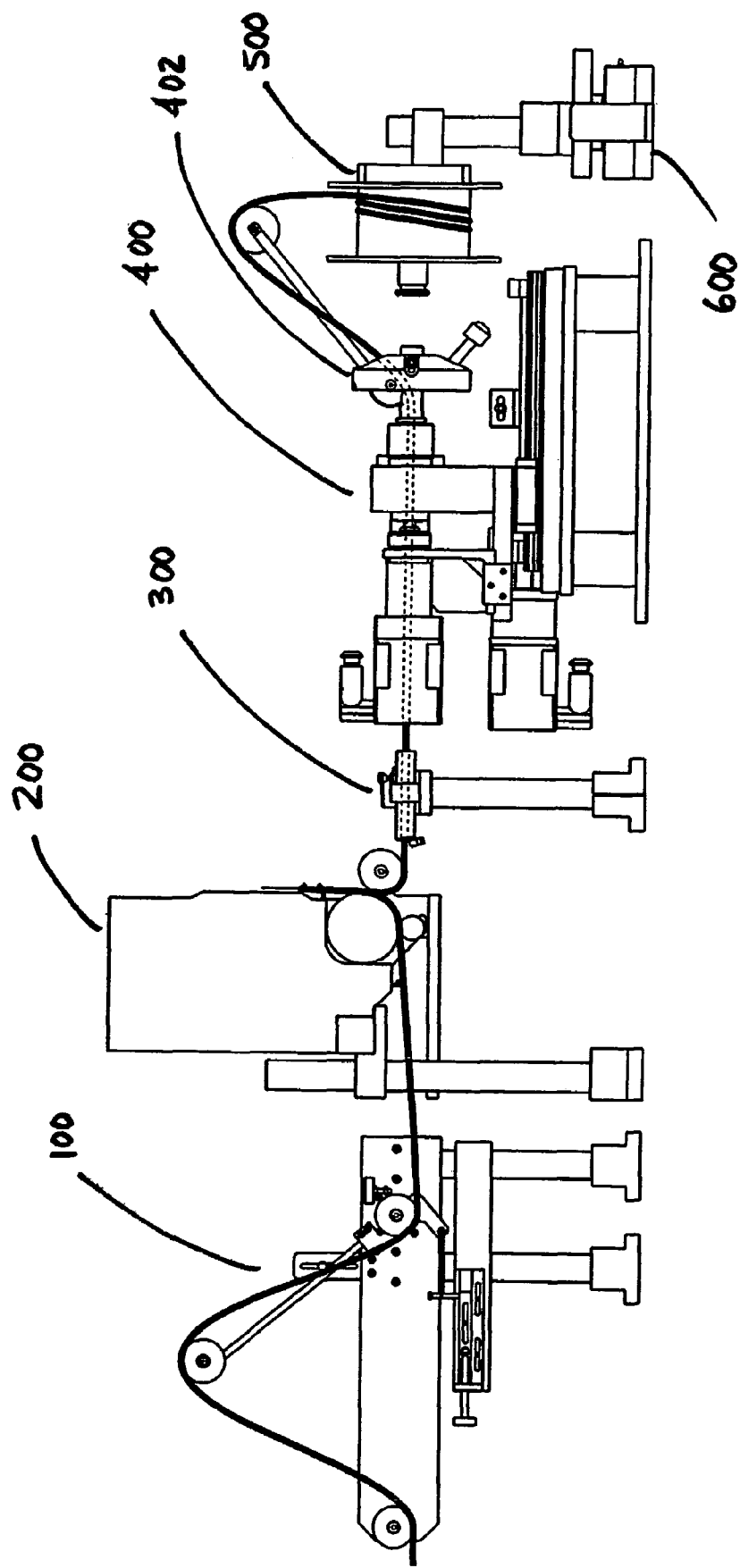
FIG. 2 shows one end of the line having a dancer arm assembly, an electronic tensioner, an air bushing, a winder and a reel mounted on a support.
Figure 3:
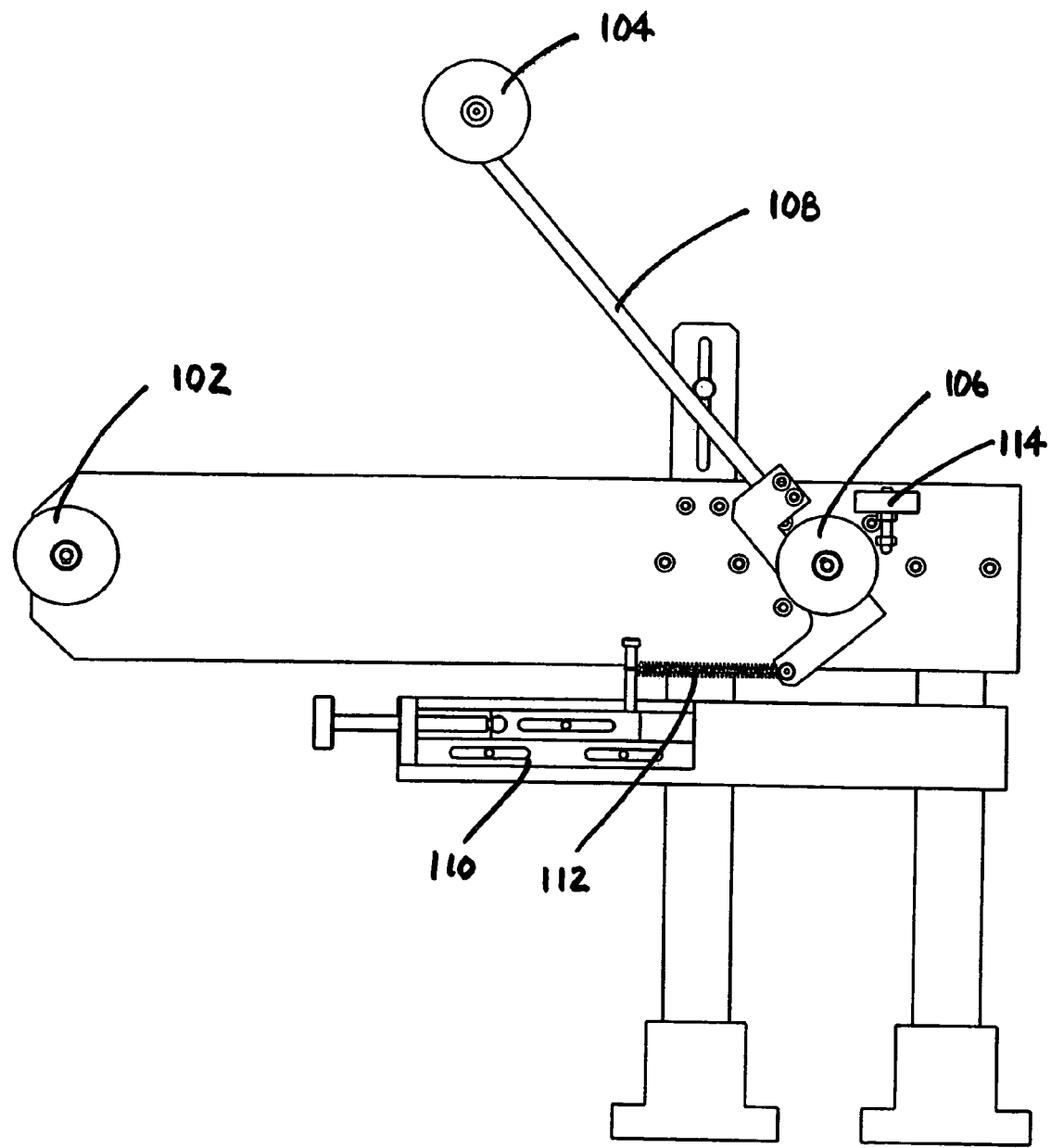
FIG. 3 is a side elevational view of the dancer arm assembly of FIG. 2.
Figure 4:
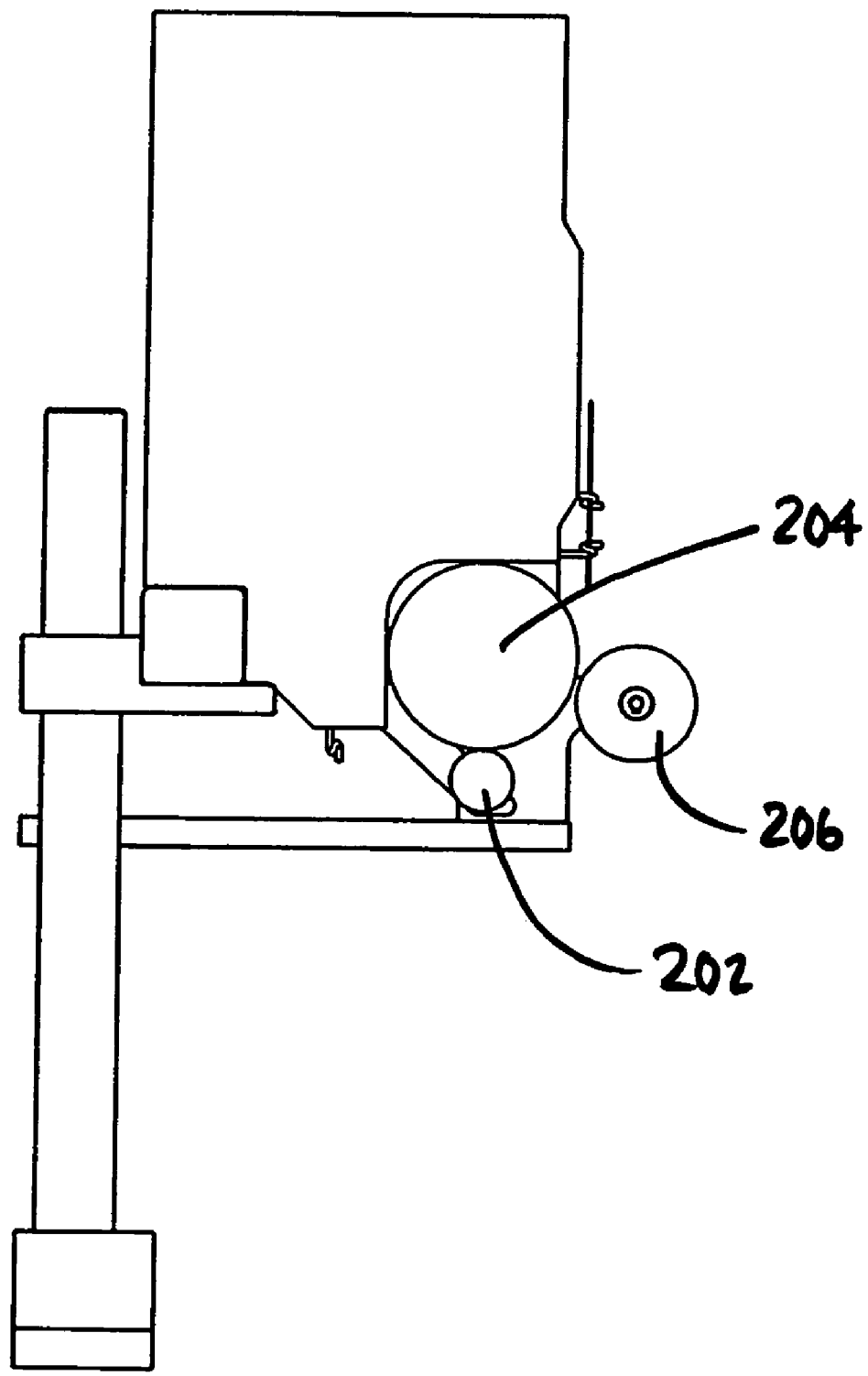
FIG. 4 is a side elevational view of the electronic tensioner of FIG. 2.
Figure 5:
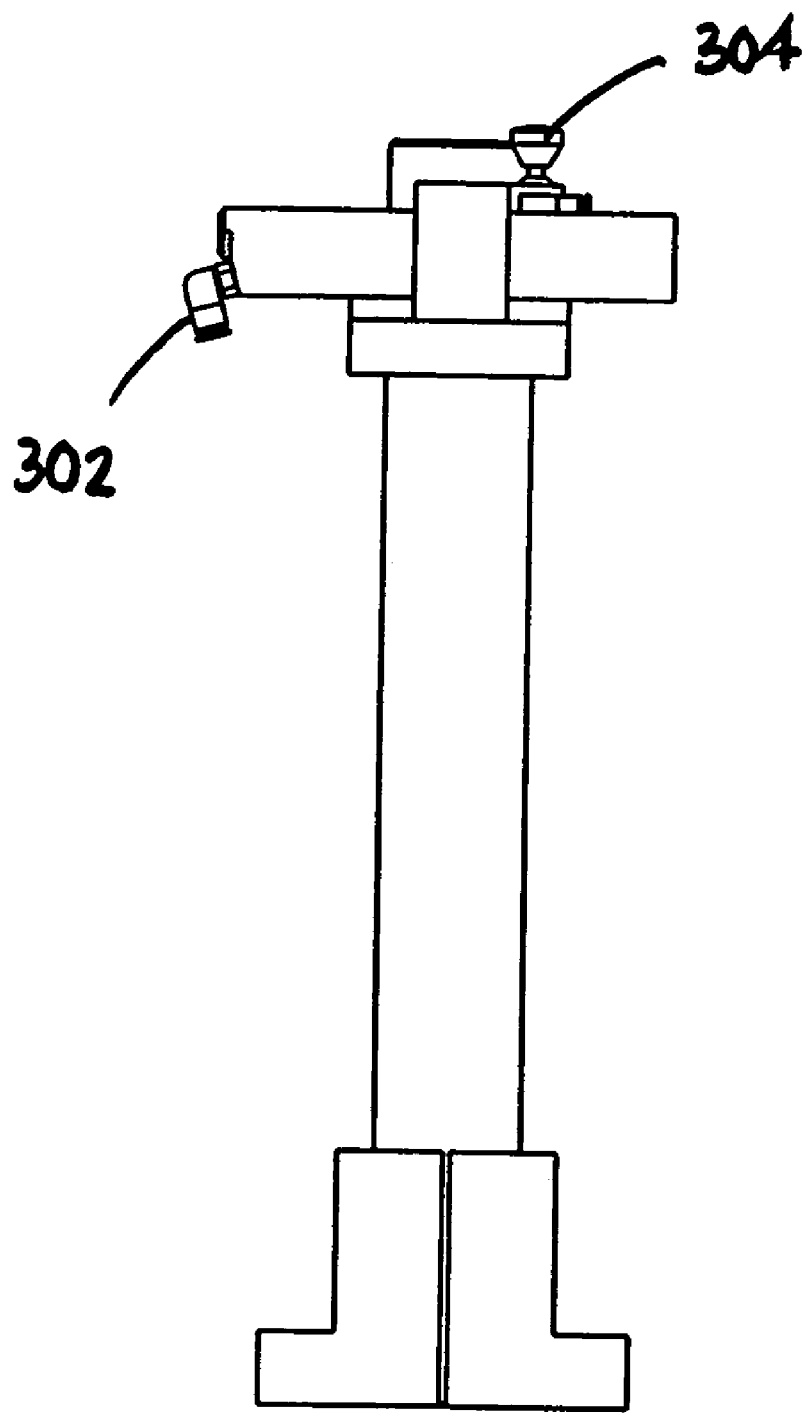
FIG. 5 is a side elevational view of the air bushing of FIG. 2.
Figure 6:
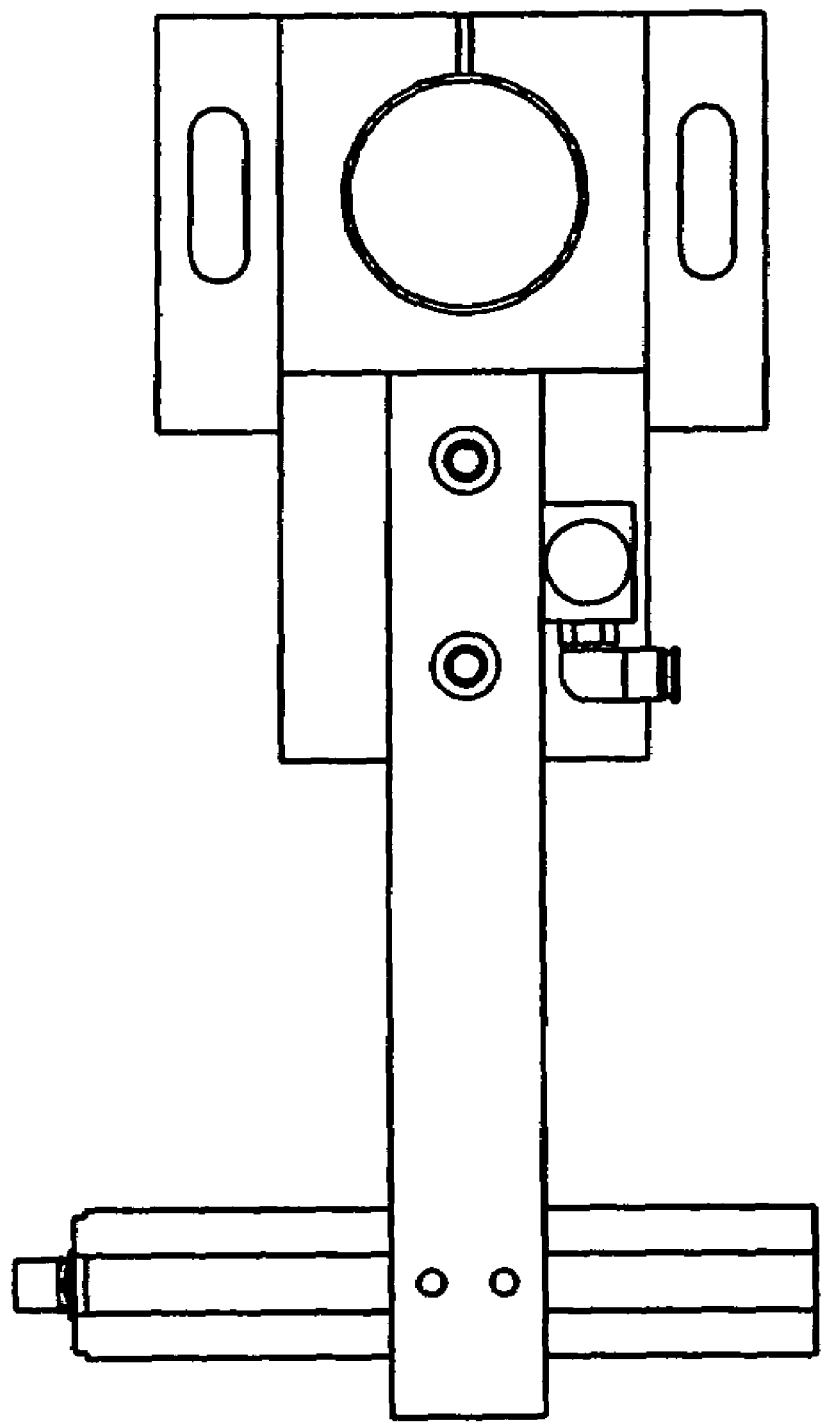
FIG. 6 is a top plan view of the air bushing of FIG. 5.
Figure 7:
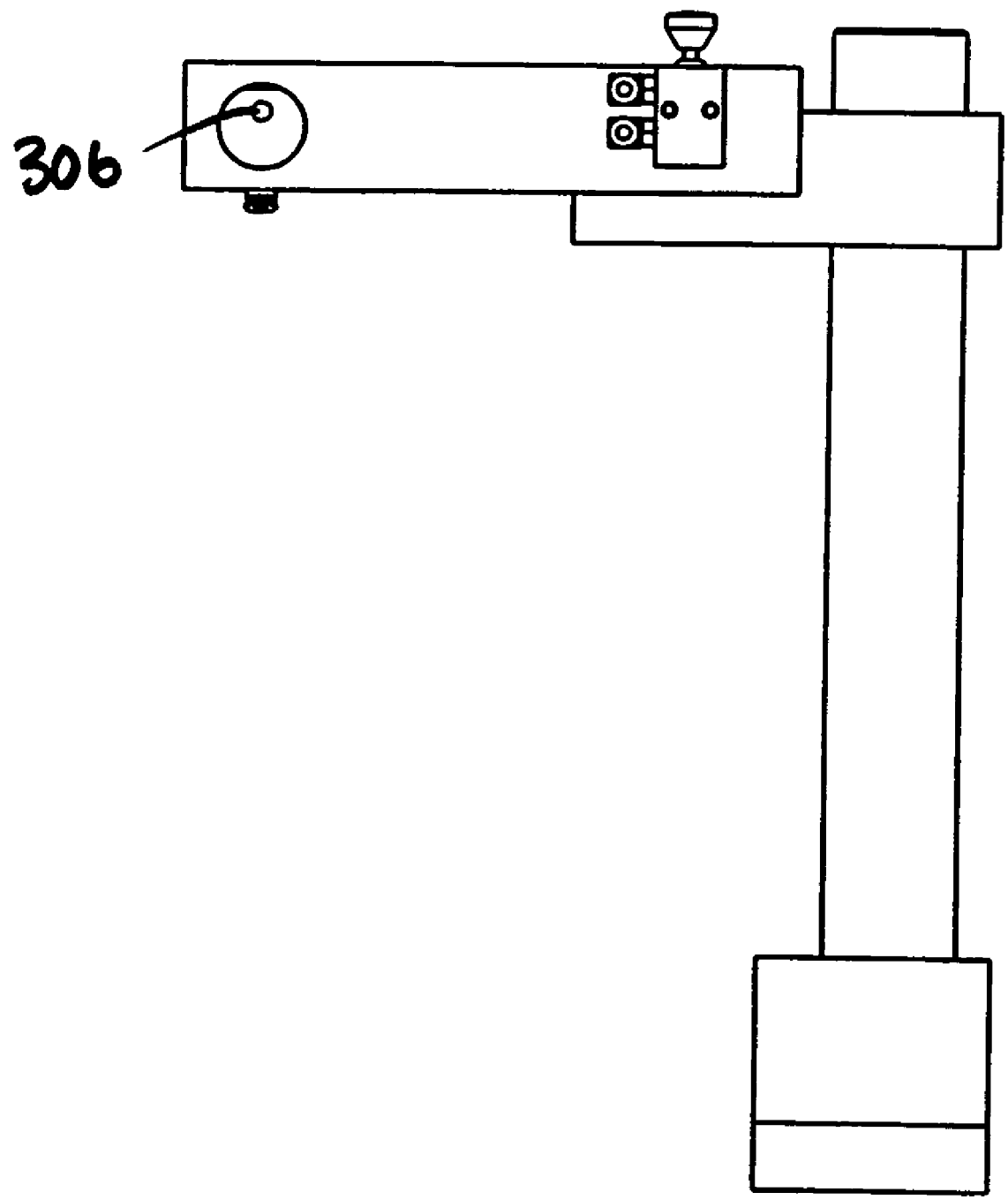
FIG. 7 is a front elevational view of the air bushing of FIG. 5.
Figure 8:
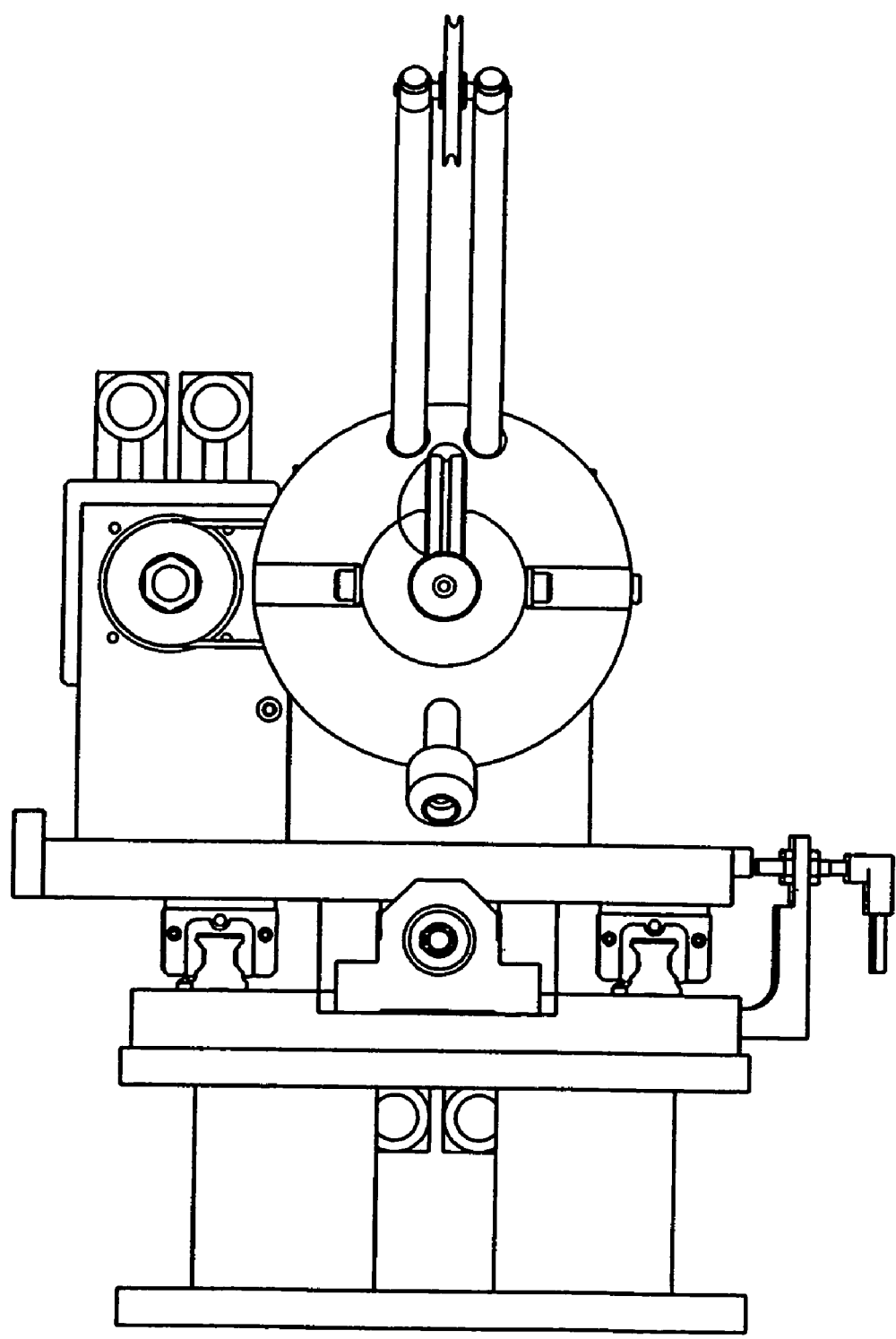
FIG. 8 is a front elevational view of the winder of FIG. 2.
Figure 9:
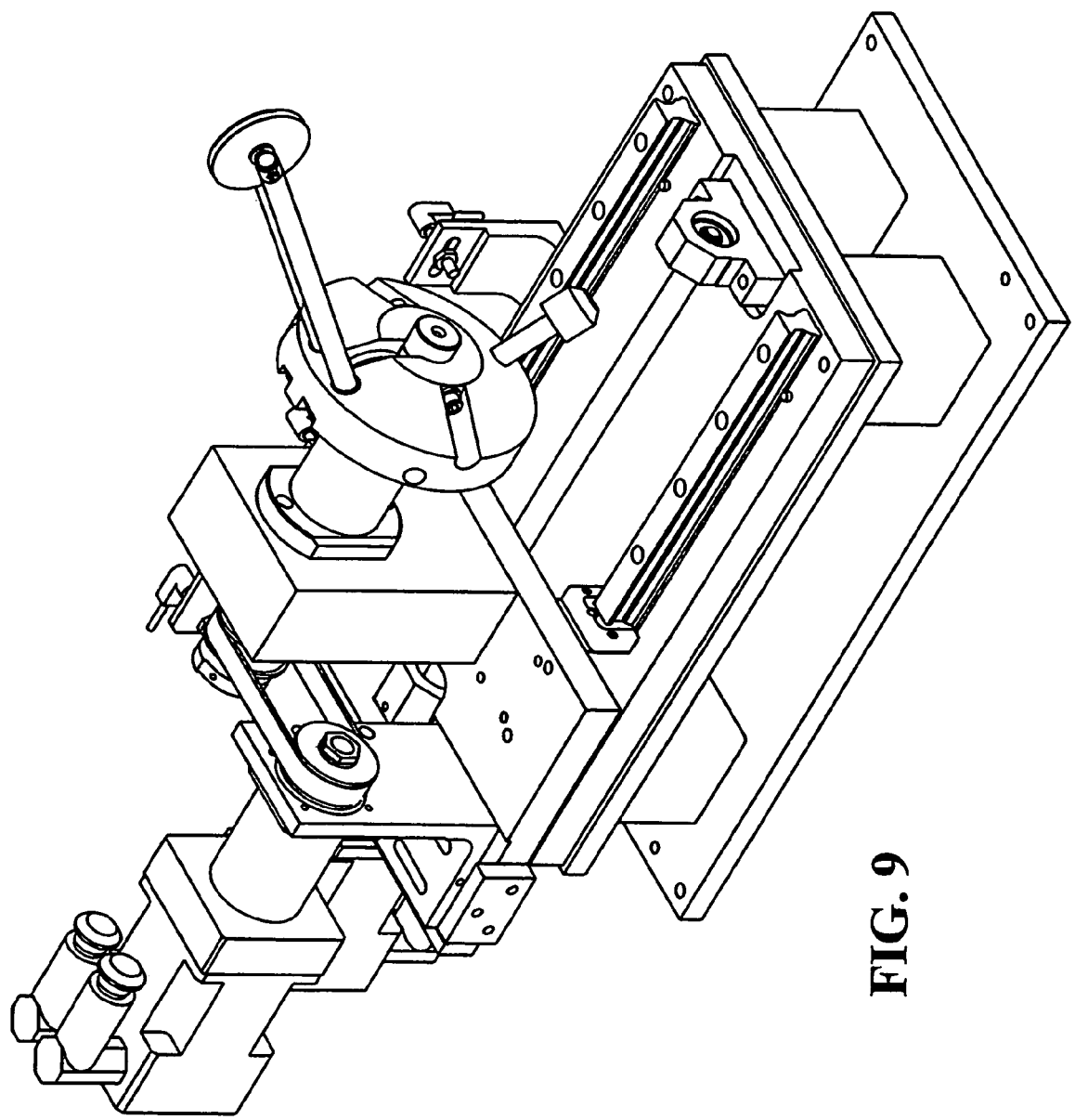
FIG. 9 is a perspective view of the winder of FIG. 8.
Figure 10:
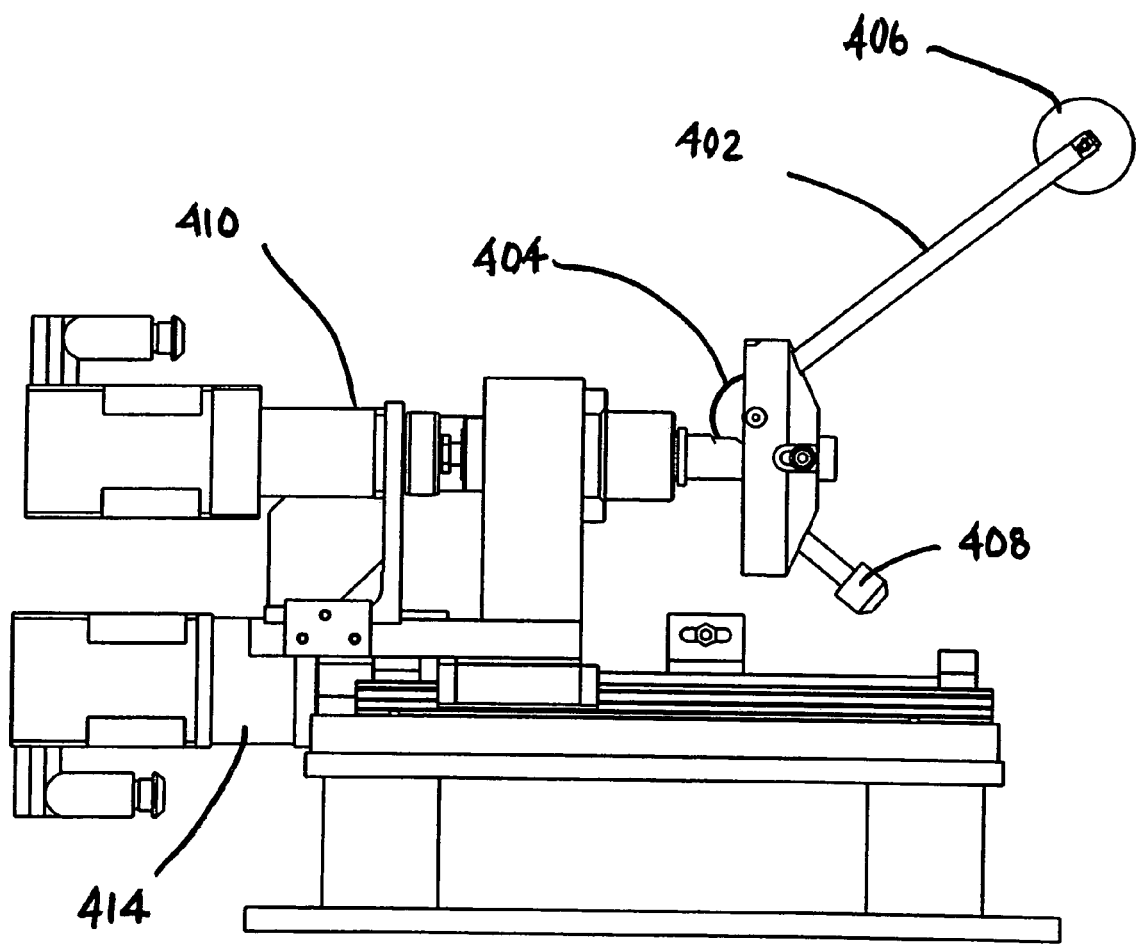
FIG. 10 is a side elevational view of the winder of FIG. 8.
Figure 11:
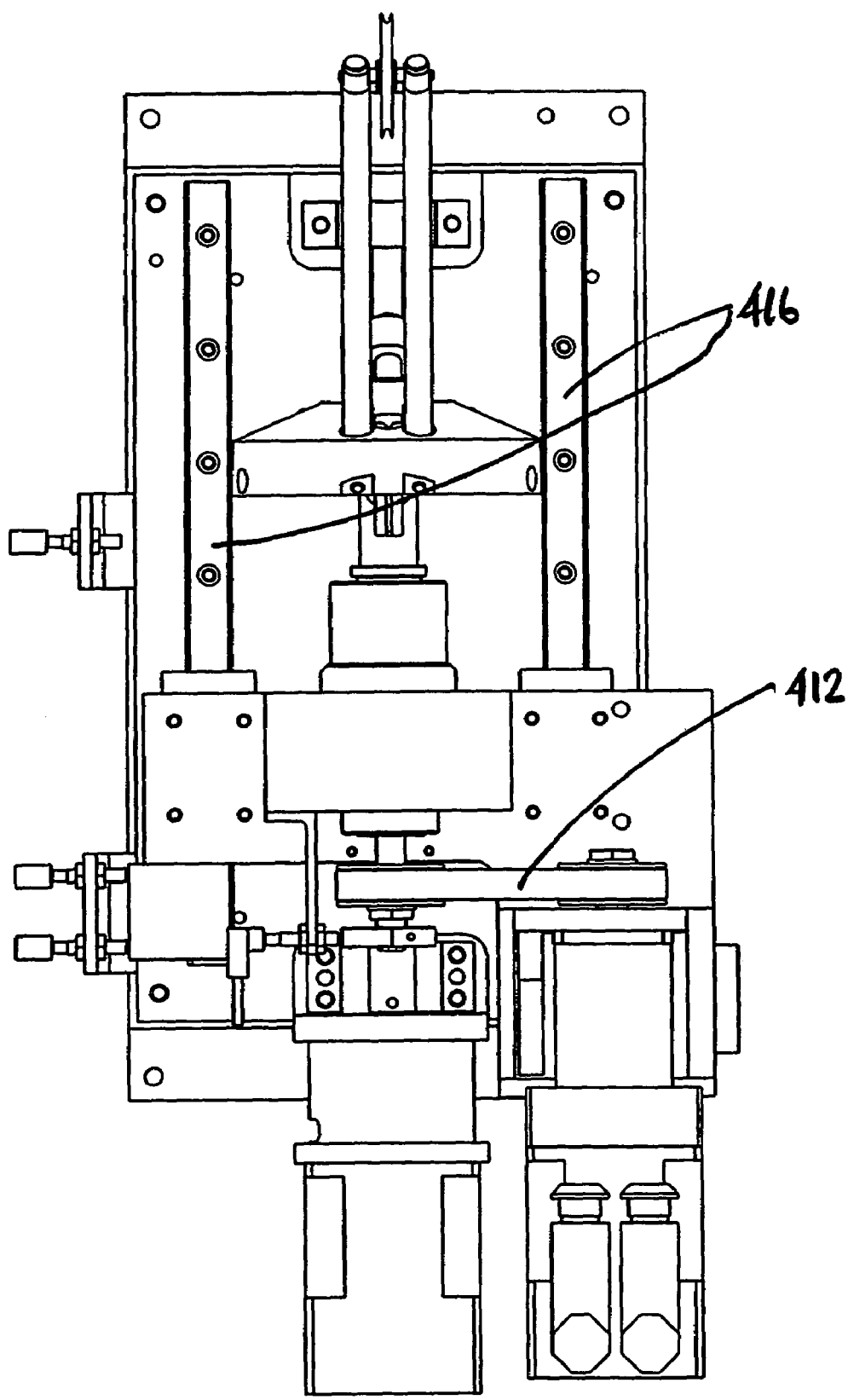
FIG. 11 is a top plan view of the winder of FIG. 8.
Figure 12:
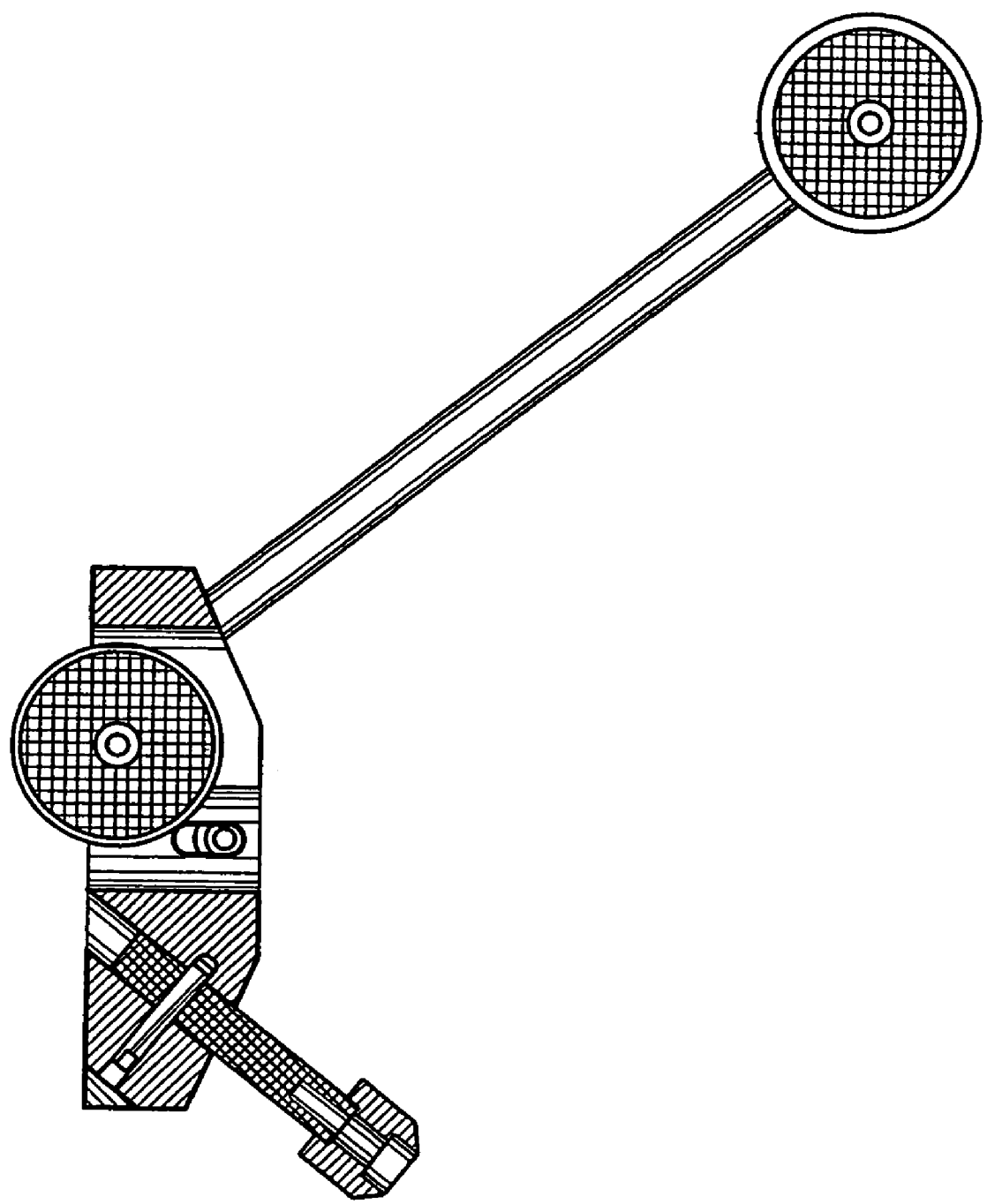
FIG. 12 is a cross-sectional view of the rotatable arm of the winder of FIG. 8.
Figure 13:
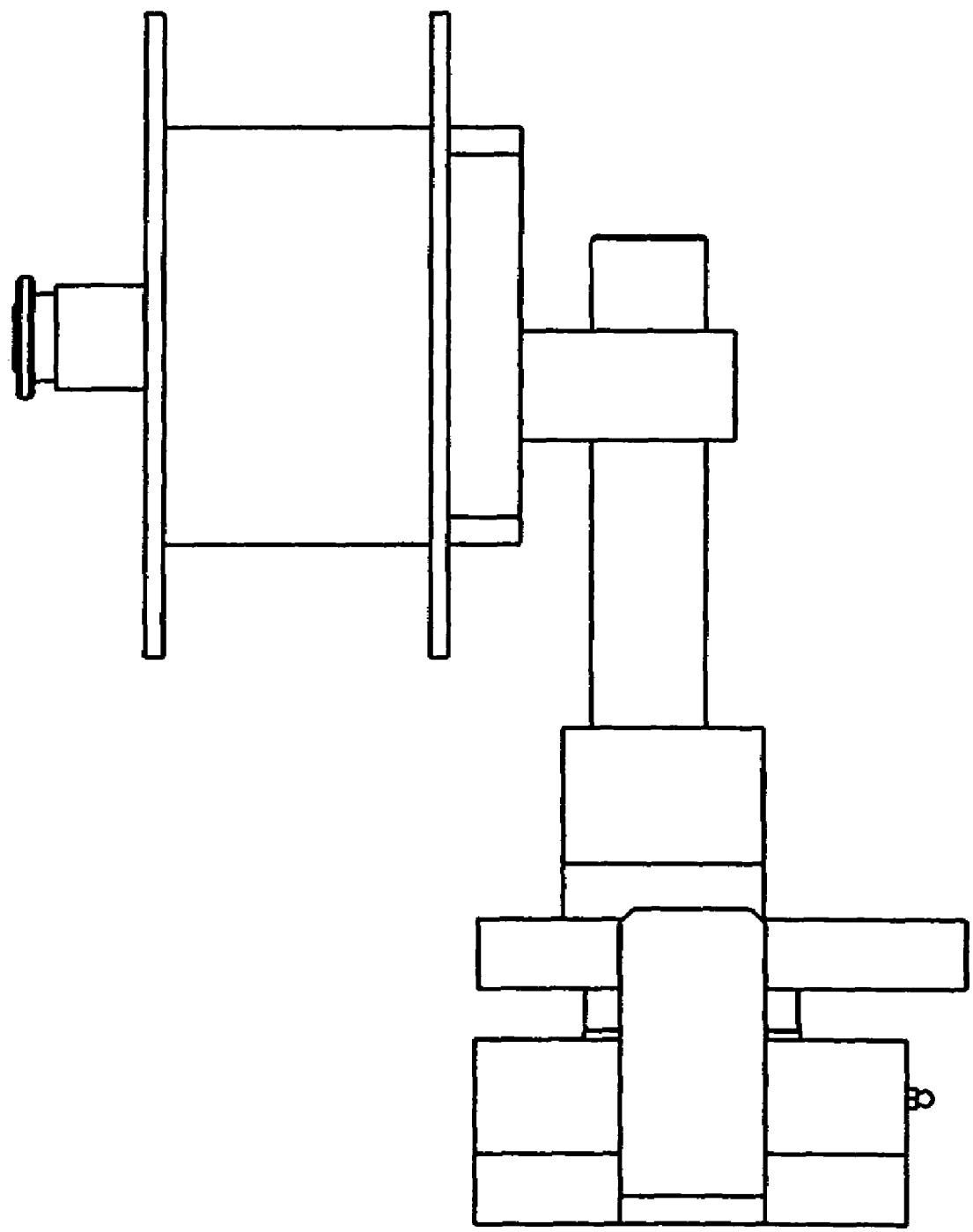
FIG. 13 is a side elevational view of the reel and support of FIG. 2.

In the drawings, preferred embodiments of the invention are illustrated by way of examples. It is to be expressly understood that the description and drawings are only for the purpose of illustration and are an aid for understanding. They are not intended to be a definition of the limits of the invention.

DETAILED DESCRIPTION OF THE PREFERRED EMBODIMENTS

A reel to reel manufacturing line for writing gratings on a fiber is illustrated in FIG. 1.

With reference to FIG. 1, the line comprises an apparatus for unwinding the fiber from a first reel (de-winder 1). De-winder 1 is placed in a cooled container 2 to slow down out gazing from the fiber if necessary.

The line comprises first and second ends, the first end being connected via an optical circulator 3 to a source of light such as a broadband light source or a tunable laser 4 and a power meter 5 (or an optical spectrum analyzer) while the second end is connected to another power meter 5 (or an optical spectrum analyzer).

By placing an optical circulator between the source of light and the connection to the fiber, and connecting a light power reading device (power meter or optical spectrum analyzer) at the third branch of the circulator, the reflection spectrum of the created gratings can be measured.

It is thus possible to measure reflection spectra of the grating at the first end with power meter 5 (or optical spectrum analyzer) while measuring transmission spectra of the grating at the second end with the other power meter 5 (or optical spectrum analyzer).

It is understood that different commercially available optical measurement apparatus can be used to monitor different optical properties of the grating since both ends of the fiber are fixed, enabling any type of optical connections, even splices.

Moreover, by using a device to rotate the orientation of the polarization states of the light source in synchronization with the power readings, the polarization dependence loss (PDL) of the created gratings can be measured.

Once the fiber is unwound without rotation of the first reel, it passes through a cleaning unit 6 and then trough an inspection unit 7 that marks defective segments by an ink jet marker 8. If the source of optical radiation (e.g. a laser) used to write the gratings can damage the removable coating or jacket of the fiber, or if the radiation is distorted by such coating or jacket, the line includes stripping apparatus (e.g. a mechanical stripper) 9 to remove the coating or jacket before the gratings are written. It is to be understood that different types of stripping apparatus can be used, such as blades based equipment, hot or cold blades; thermal/energy, such as electric elements, laser or hot gas based equipment; or chemical/solvent based equipment.

The bare glass fiber section is then cleaned by a cleaning unit 10, inspected and marked if defective. Several type of cleaning units such as fiber surface sweeping by soft wet tissue and/or brush, inert gas flow and electro-static discharge can be used.

The fiber is then guide by guiding devices 11 designed to avoid contacts with the stripped region of the fiber until the latter leaves a recoating unit 14.

Once the stripped region of the fiber reaches a processing station such as a source of optical radiation (laser or holoscope) 12, it is grabbed on each coated side by tensioning clamps (e.g. tensioners) 13.

By putting the stripped region of the fiber under desired longitudinal tension while it is under source of optical radiation 12, the spectra of the gratings can be separated from the spectra of those previously written, enabling real time monitoring for fabrication process control. Moderated longitudinal tension on the fiber does not deform the spectra, but translate it along the wavelength axis. So, array of even similar gratings can be made and individual spectra can be measured by tensioning longitudinally the fiber while writing and annealing, and relieving the tension for re-winding. As the longitudinal tension on the fiber is relieved, another optical measurement can be made to track the spectra's peaks translation along wavelength axis for exact center wavelength measurement.

Alternatively, the stripped region of the fiber can be put under minimal tension and the previously formed gratings can be re-wind under tension to translate same to other wavelengths.

If Fabri-Perot effects are negligible, it is understood that final optical measurements of the previous gratings can be used as a base reference, and it is then possible to monitor the changes in the spectra as a new gratings is created to isolate the optical properties of that particular gratins from the others. Since, each grating can be written and annealed successively, its final optical properties can be measured directly in line with more precision since all the other optical elements between the light source and the detector are stable during the full fabrication process, and so these other elements can be characterized in an initial reference measurement.

Once the gratings is written, stabilized and measured, the stripped and written region of the fiber moves into recoating unit 14. If, in addition, the process includes an in-line fiber gratings annealing step, instead of an off-line batch annealing, the written region would not required further optical measurements since both ends of the fiber are connected and all the quality control can therefore be made in line.

The recoated fiber passes through another inspection unit 7 that marks defective segments by an ink jet marker. The inspection may be performed by visual inspection stations having for example cameras or analyzer systems. With this type of inspection, the protective coating integrity is monitored all along the fiber and in-line proof testing is possible after the recoating station to insure fiber's mechanical (micro-cracks) integrity and mechanical lifetime.

An ink jet encoder 15 identifies the cutting lines and the sub-section for the automated packing line. Finally, the fiber is re-wound on a second reel by an apparatus for winding (winder 16), without rotation of second reel.

Since both ends of the fiber are fixed and stable all along the delivering of the fiber from the first reel to the second reel, it is possible to have a line that is compatible to any optical measurement system, regardless of the type and sensitivity of connections required. It is understood that a multiple types of optical measurements, such as chromatic dispersion, can be used in conjunction with the line.

All the components of the line are controlled by a central computer that synchronizes the motions, analyzes the acquired data and controls the process, and stores all pertinent data for process monitoring and optimization in a central database. Synchronization of motions is achieved by pre-mapping, calibration and position sensors combined to a software program, running in a constant feedback loop mode, that send parameter settings to the different functional units and movable devices.

The in-line optical measurements are in a constant feedback loop mode to control the parameters and the duration of the expositions in source of optical radiation 12 during the fiber grating writing, as well as, during the fiber grating annealing.

Results of the fiber inspection units are acquired by the computer and a software program analyzes them to re-adjust specific functional apparatus parameters settings.

The central computer also controls the ink jet markers that are located all along the line. A bar code protocol to mark the fiber with specific messages at specific locations. These messages may include the serial number of the device, the cutting lines where the fiber should be cut later on, as well as different quality control's codes for various ranges of defects. The bar code marks can be read in other automated lines, such as a un-winding/packing/triage automated line to obtain ready to ship products.

Using the methods, tests and criteria known by the person skilled in the art, the following quality control parameters are measured on the line: surface and coating defects and contamination all along the process, mechanical integrity through the in-line proof test functional unit, final and intermediary optical properties (transmission and reflection spectra, polarization dependence loss (PDL), polarization mode dispersion (PMD) and optical life expectancy through index profile decay during annealing.

In a particular embodiment, a commercially available self synchronized multi-ports sweep system is used for the optical measurements. This system includes a rotational device of the polarization states that enables in line measurements of polarization dependence loss (PDL) and polarization mode dispersion (PMD) in addition to the transmission and reflection spectra. These measurements are in compliance with the telecommunication industrial standards, such the Fiber Optic Test Procedure of the Electronic Industry Association and Telecommunication Industry Association.

Computerized data acquisition from the different elements of the line can be used to identify the spectra, location, quality/integrity of the different gratings and parts of the array. In a second step, the second reel can feed an automated packing line. The completed manufacturing reel to reel line can be located in an atmosphere-controlled chamber.

With reference to FIGS. 2 to 13, the second end of the reel to reel manufacturing line is illustrated in more details.

The fiber passes through a dancer arm assembly 100, an electronic tensioner 200, an air bushing 300, a winder 400 having a rotatable arm 402 that turns around a reel 500 mounted on a support 600.

More specifically, the fiber enters dancer arm assembly 100 under a first roller 102, then passes over a second roller 104 and under a third roller 106. Dancer arm assembly 100 also comprises an arm 108 having second roller 104 mounted at its distal end and third roller 106 mounted adjacent its proximal end. Proximal end of arm 108 is attached to an adjustment mechanism 110 through a spring 112. Spring 112 counter balances the force exerted by the fiber on second roller 104. The tension of spring 112 can be adjusted by adjustment mechanism 110. Third roller 106 is mounted adjacent to a potentiometer 114 that reads the angular position of arm 108. In this matter, the tension in the fiber is also read. In fact, tensionsensors such as potentiometer 114, provide feedback to the software program for sudden acceleration and fine tuning of the synchronization and speed of the fiber. If the feedback loop frequency is too low, due to specific hardware limitations in combination with specific fast accelerations of the fiber, direct logical circuitry can be used to increase the feedback loop frequency.

The fiber then passes between first and second wheels 202, 204 mounted on electronic tensioner 200, up and around (a full turn) a wire brake wheel also mounted on electronic tensioner 200, then up (half a turn) and around a wire tension take-up wheel 206.

The fiber passes then through air bushing 300 that serves to guide and push the fiber through winder 400. The air enters by a fitting 302, its flow is adjusted by a valve 304, and leaves through orifice 306.

The optical fiber then passes under a first roller 404 of winder 400 and then over a second roller 406, rollers 404, 406 being mounted at each end of rotatable arm 402. Winder 400 also comprises a counter weight 408. Winder 400 further comprises a winder servomotor 410 that actuates rotatable arm 402 via a belt 412. Winder servomotor 410 is placed beside the fiber path and its speed is controlled by the position of arm position 108, via potentiometer 114. Winder 400 further comprises a position servomotor 414 and a pair of rails 416 on which position servomotor 414 is movable. Winder servomotor 410 is mounted on position servomotor 414. The translation speed of position servomotor 414 and the rotational speed of winder servomotor 410 are controlled and synchronized in order to properly winding the fiber of reel 500.

It is understood that the present invention could be use on any existing grating writing process to enhance its throughput, for re-measurements of fiber grating arrays, or for many kind of measurement of properties of the fiber along its length since the de-winder and winder of the reels that de-winds and winds the fiber without its rotation enables the permanent connections of both ends of the fiber to measurement devices.

Indeed, the present invention also covers a line for measuring optical properties of gratings written on a fiber having first and second ends. More particularly, the line also comprises first and second supports for receiving first and second reels, the first reel having the fiber wounded thereon. The line further also comprising a de-winder for unwinding the fiber without rotation of the reel and a winder for winding the fiber on the second reel without rotation of the second reel. Finally, the line comprises a source of light connected at one of the first and second ends of the fiber and a measurement means connected at one of the first and second ends of the fiber for measuring optical properties of the gratings.

The above description of preferred embodiments should not be interpreted in a limiting manner since other variations, modifications and refinements are possible within the spirit and scope of the present invention. The scope of the invention is defined in the appended claims and their equivalents.

The invention claimed is:

1. An apparatus for handling an optical fiber having a first end and a second end, the optical fiber being at least partially wound on a reel, said apparatus comprising:
   an optical device for coupling with the first end of the optical fiber to allow an optical signal to be exchanged between said optical device and the optical fiber;
   a de-winding mechanism for unwinding the optical fiber from the reel without rotation of the reel to enable the optical signal to be exchanged between said optical device and the optical fiber; and
   a manufacturing apparatus for performing a manufacturing process on a portion of the optical fiber unwound from the reel by said de-winding mechanism.

2. An apparatus as defined in claim 1, wherein said optical device generates is adapted for generating the optical signal such that the optical signal propagates along the optical fiber.

3. An apparatus as defined in claim 1, wherein the optical signal propagates along the optical fiber and is output at the first end, said optical device being adapted for receiving the optical signal.

4. An apparatus as defined in claim 1, wherein the reel is a first reel, said apparatus being adapted for receiving a second reel, said apparatus comprising a winding mechanism for winding the portion of the optical fiber on the second reel without rotation of the second reel.

5. An apparatus as defined in claim 4, wherein said optical device is a first optical device, said apparatus comprising a second optical device for coupling with the second end of the optical fiber, said first optical device being adapted for generating the optical signal such that the optical signal propagates along the optical fiber and is released at the second end of the optical fiber.

6. An apparatus as defined in claim 1, wherein said manufacturing process comprises producing a grating on the portion of the optical fiber.

7. An apparatus as defined in claim 6, wherein said manufacturing apparatus comprises a source of electromagnetic radiation to produce the grating on the portion of the optical fiber.

8. An apparatus as defined in claim 7, wherein the optical signal is indicative of at least one characteristic of the grating.

9. An apparatus as defined in claim 8, wherein said optical device is adapted for receiving the optical signal from the first end and deriving at least in part on the basis of the optical signal a reflection spectrum of the grating.

10. An apparatus as defined in claim 1, wherein said de-winding mechanism comprises a rotatable arm for rotating around the reel.

11. An apparatus as defined in claim 1, wherein the optical fiber comprises a coating, said manufacturing process comprising modifying the coating of the portion of the optical fiber.

12. An apparatus as defined in claim 11, wherein said manufacturing apparatus is operative for removing the coating of the portion of the optical fiber.

13. An apparatus as defined in claim 12, wherein said manufacturing apparatus is further operative for applying a new coating on the portion of the optical fiber.

14. A method for handling an optical fiber having a first end and a second end, the optical fiber being at least partially wound on a reel, said method comprising:
   a) coupling the first end to an optical device to allow an optical signal to be exchanged between the optical device and the optical fiber;
   b) unwinding the optical fiber from the reel without rotation of the reel to enable the optical signal to be exchanged between the optical device and the optical fiber; and
   c) performing a manufacturing process on a portion of the optical fiber unwound from the reel by said unwinding.

15. A method as defined in claim 14, wherein the optical device generates the optical signal such that the optical signal propagates along the optical fiber.

16. A method as defined in claim 14, wherein the optical signal propagates along the optical fiber and is output at the first end of the optical fiber, the optical device receiving the optical signal.

17. A method as defined in claim 14, wherein the reel is a first reel, said method comprising winding the portion of the optical fiber on a second reel without rotation of the second reel.

18. A method as defined in claim 17, wherein the optical device is a first optical device, said method further comprising coupling the second end of the optical fiber to a second optical device, the optical signal being generated by the first optical device and propagating along the optical fiber, the optical signal being released at the second end of the optical fiber.

19. A method as defined in claim 14, wherein said performing a manufacturing process comprises producing a grating on the portion of the optical fiber.

20. A method as defined in claim 19, wherein said producing the grating comprises generating electromagnetic radiation to produce the grating on the portion of the optical fiber.

21. A method as defined in claim 20, wherein the optical signal is indicative of at least one characteristic of the grating.

22. A method as defined in claim 21, wherein the optical device receives the optical signal from the first end and assesses at least in part on the basis of the optical signal a reflection spectrum of the grating.

23. A method as defined in claim 14, wherein the optical fiber comprises a coating, said performing a manufacturing process comprising modifying the coating of the portion of the optical fiber.

24. A method as defined in claim 23, wherein said modifying the coating of the portion of the optical fiber comprises removing the coating of the portion of the optical fiber.

25. A method as defined in claim 24, further comprising applying a new coating on the portion of the optical fiber.

26. An apparatus for handling a continuous length of an optical fiber, a first portion of the continuous length being wound on a first reel, a second portion of the continuous length being wound on a second reel, said apparatus comprising:
 a signal source for introducing an optical signal in the optical fiber to allow the optical signal to propagate in the first and second portions of the continuous length;
 a mechanism for transferring optical fiber from the first reel to the second reel without rotation of the first reel and the second reel to enable the optical signal to propagate in the first and second portions of the continuous length; and
 a manufacturing apparatus for performing a manufacturing process on a given portion of the optical fiber located between the first reel and the second reel.

27. An apparatus as defined in claim 26, wherein said manufacturing process comprises producing a grating on the given portion of the optical fiber.

28. An apparatus as defined in claim 27, wherein said manufacturing apparatus comprises a source of electromagnetic radiation to produce the grating on the given portion of the optical fiber.

29. An apparatus as defined in claim 28, wherein the optical signal is indicative of at least one characteristic of the grating.

30. An apparatus as defined in claim 26, wherein the optical fiber comprises a coating, said manufacturing process comprising modifying the coating of the given portion of the optical fiber.

31. An apparatus as defined in claim 30, wherein said manufacturing apparatus is operative for removing the coating of the given portion of the optical fiber.

32. An apparatus as defined in claim 31, wherein said manufacturing apparatus is further operative for applying a new coating on the given portion of the optical fiber.

33. A method for handling a continuous length of an optical fiber, a first portion of the continuous length being wound on a first reel, a second portion of the continuous length being wound on a second reel, said method comprising:
 a) introducing an optical signal in the optical fiber such that the optical signal propagates in the first and second portions of the continuous length;
 b) transferring optical fiber from the first reel to the second reel without rotation of the first reel and the second reel to enable the optical signal to propagate in the first and second portions of the continuous length; and
 c) performing a manufacturing process on a given portion of the optical fiber located between the first reel and the second reel.

34. A method as defined in claim 33, wherein said manufacturing process comprises producing a grating on the given portion of the optical fiber.

35. A method as defined in claim 34, wherein said producing the grating comprises generating electromagnetic radiation to produce the grating on the given portion of the optical fiber.

36. A method as defined in claim 35, wherein the optical signal is indicative of at least one characteristic of the grating.

37. A method as defined in claim 33, wherein the optical fiber comprises a coating, said performing a manufacturing process comprising modifying the coating of the given portion of the optical fiber.

38. A method as defined in claim 37, wherein said modifying the coating of the given portion of the optical fiber comprises removing the coating of the given portion of the optical fiber.

39. A method as defined in claim 38, further comprising applying a new coating on the given portion of the optical fiber.

40. In combination:
 a) an optical fiber having a first end and a second end, the optical fiber being at least partially wound on a reel:
 b) an optical device in a condition of non-rotating optical coupling with said first end of the optical fiber to allow an optical signal to be exchanged between said optical device and the optical fiber;
 c) a de-winding mechanism for unwinding the optical fiber from the reel while said condition of non-rotating optical coupling exists; and
 d) a manufacturing apparatus for performing a manufacturing process on a portion of the optical fiber unwound from the reel by said de-winding mechanism.

41. A combination as defined in claim 40, wherein said optical device is adapted for generating the optical signal such that the optical signal propagates along the optical fiber.

42. A combination as defined in claim 40, wherein the optical signal propagates along the optical fiber and is output at the first end, said optical device being adapted for receiving the optical signal.

43. A combination as defined in claim 40, wherein the reel is a first reel, said combination comprising a winding mechanism for winding the portion of the optical fiber on a second reel.

44. A combination as defined in claim 40, wherein said manufacturing process comprises producing a grating on the portion of the optical fiber.

45. A combination as defined in claim 44, wherein said manufacturing apparatus comprises a source of electromagnetic radiation to produce the grating on the portion of the optical fiber.

46. A combination as defined in claim 45, wherein the optical signal is indicative of at least one characteristic of the grating.

47. A combination as defined in claim 46, wherein said optical device is adapted for receiving the optical signal from the first end and for deriving at least in part on the basis of the optical signal a reflection spectrum of the grating.

48. A combination as defined in claim 40, wherein said optical device is a first optical device, said combination comprising a second optical device in a condition of non-rotating optical coupling with the second end of the optical fiber, said first optical device being adapted for generating the optical signal such that the optical signal propagates along the optical fiber and is released at the second end.

49. A combination as defined in claim 40, wherein the optical fiber comprises a coating, said manufacturing process comprising modifying the coating of the portion of the optical fiber.

50. A combination as defined in claim 49, wherein said manufacturing apparatus is operative for removing the coating of the portion of the optical fiber.

51. A combination as defined in claim 50, wherein said manufacturing apparatus is further operative for applying a new coating on the portion of the optical fiber.

52. A method for handling an optical fiber having a first end and a second end, the optical fiber being at least partially wound on a reel, the method comprising:
   a) establishing a condition of non-rotating optical coupling between an optical device and the first end of the optical fiber to allow an optical signal to be exchanged between the optical device and the optical fiber;
   b) unwinding the optical fiber from the reel while the condition of non-rotating optical coupling exists; and
   c) performing a manufacturing process on a portion of the optical fiber unwound from the reel by said unwinding.

53. An apparatus for handling an optical fiber having an end, said apparatus comprising:
   a) an optical device for coupling with the end of the optical fiber to allow an optical signal to be exchanged between said optical device and the optical fiber;
   b) a manufacturing apparatus for performing a manufacturing process on a portion of the optical fiber to be wound on a reel; and
   c) a winding mechanism for winding the portion of the optical fiber on the reel without rotation of the reel to enable the optical signal to be exchanged between said optical device and the optical fiber.

54. An apparatus as defined in claim 53, wherein said manufacturing process comprises producing a grating on the portion of the optical fiber.

55. An apparatus as defined in claim 54, wherein said manufacturing apparatus comprises a source of electromagnetic radiation to produce the grating on the portion of the optical fiber.

56. An apparatus as defined in claim 55, wherein the optical signal is indicative of at least one characteristic of the grating.

57. An apparatus as defined in claim 53, wherein the optical fiber comprises a coating, said manufacturing process comprising modifying the coating of the portion of the optical fiber.

58. An apparatus as defined in claim 57, wherein said manufacturing apparatus is operative for removing the coating of the portion of the optical fiber.

59. An apparatus as defined in claim 58, wherein said manufacturing apparatus is further operative for applying a new coating on the portion of the optical fiber.

60. A method for handling an optical fiber having an end, said method comprising:
   a) coupling the end of the optical fiber to an optical device to allow an optical signal to be exchanged between the optical device and the optical fiber;
   b) performing a manufacturing process on a portion of the optical fiber to be wound on a reel; and
   c) winding the portion of the optical fiber on the reel without rotation of the reel to enable the optical signal to be exchanged between the optical device and the optical fiber.

61. In combination:
   a) an optical fiber having an end;
   b) an optical device in a condition of non-rotating optical coupling with said end to allow an optical signal to be exchanged between said optical device and the optical fiber;
   c) a manufacturing apparatus for performing a manufacturing process on a portion of the optical fiber to be wound on a reel; and
   d) a winding mechanism for winding the portion of the optical fiber on the reel while said condition of non-rotating optical coupling exists.

* * * * *